US011235938B2

(12) United States Patent
Okamoto et al.

(10) Patent No.: US 11,235,938 B2
(45) Date of Patent: Feb. 1, 2022

(54) IMAGE READING APPARATUS (71) Applicant: Brother Kogyo Kabushiki Kaisha, Nagoya (JP)

(72) Inventors: Yoshihiro Okamoto, Komaki (JP); Tomoyuki Mizuno, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/797,340

(22) Filed: Feb. 21, 2020

(65) Prior Publication Data
US 2020/0307930 A1  Oct. 1, 2020

(30) Foreign Application Priority Data
Mar. 27, 2019 (JP) .............................. JP2019-061608

(51) Int. Cl.
*B65H 5/00* (2006.01)
*B65H 3/06* (2006.01)
*B41J 13/10* (2006.01)
*B65H 5/06* (2006.01)

(52) U.S. Cl.
CPC .......... *B65H 3/0684* (2013.01); *B41J 13/103* (2013.01); *B65H 5/062* (2013.01); *B65H 5/008* (2013.01); *B65H 2301/42342* (2013.01); *B65H 2511/13* (2013.01)

(58) Field of Classification Search
CPC ........ B65H 1/08; B65H 3/0684; B65H 5/062; B65H 5/008; B65H 2301/42342
See application file for complete search history.

(56) References Cited

U.S. PATENT DOCUMENTS

2014/0353905 A1*  12/2014  Takahata .............. B65H 3/5223
271/121

FOREIGN PATENT DOCUMENTS

| JP | 05201571 A | * | 8/1993 |
| JP | 05213468 A | * | 8/1993 |
| JP | 05330683 A | * | 12/1993 |
| JP | 06016271 A | * | 1/1994 |
| JP | 06156764 A | * | 6/1994 |
| JP | 2016-160006 A |   | 9/2016 |

* cited by examiner

Primary Examiner — Howard J Sanders
(74) Attorney, Agent, or Firm — Burr & Brown, PLLC (57) ABSTRACT

An image reading apparatus, including a feed tray, a conveyance guide, a feed roller, a separator, a reading sensor, and a controller, is provided. The feed tray supports sheets for being fed and has a movable plate movable between a standby position and a feedable position. The feed roller is movable and feeds the sheets to be conveyed along the conveyance guide. A positional relation between the feed roller and an uppermost sheet in the sheets is maintained within a predetermined range by the movable plate located at the feedable position. The controller controls at least rotating-and-stopping movements of the feed roller and the separator and ascending-and-descending movements of the movable plate. While the feed roller feeds the sheets, the controller conducts a vibrating action, in which the movable plate located at the feedable position is moved to ascend and descend for a plurality of times.

9 Claims, 8 Drawing Sheets

IMAGE READING APPARATUS

CROSS REFERENCE TO RELATED APPLICATION

This application claims priority from Japanese Patent Application No. 2019-061608, filed on Mar. 27, 2019, the entire subject matter of which is incorporated herein by reference.

BACKGROUND

Technical Field

An aspect of the present disclosure is related to an image reading apparatus.

Related Art

An image reading apparatus including a sheet conveying apparatus is known. The sheet conveying apparatus may include a feed tray, a conveyance guide, a feed roller, a separation roller, a separation pad, and a reading sensor.

The feed tray may support sheets to be fed. The conveyance guide may be a part of an upward surface of an upper chute member and may guide the sheets being conveyed from the feed tray. The feed roller may feed the sheet supported on the feed tray along the conveyance guide. The separation roller and the separation pad may separate the sheets fed by the feed roller from one another and convey the separated sheets one by one along the conveyance guide. The reading sensor may stay still at a stationary reading position and read images of the sheets being conveyed along the conveyance guide.

SUMMARY

While a user may occasionally use different types of sheets such as thinner sheets with more pliability or sheets that may curl easily in the sheet conveying apparatus, leading edges of those sheets may be caught by or collide with irregularities in the conveyance guide, such as small bumps, uneven surfaces, and bends. In other words, a variety of types of sheets may not be conveyed along the conveyance guide suitably or smoothly.

The present disclosure is advantageous in that an image reading apparatus, in which a variety of types of sheets are conveyable along a conveyance guide smoothly, is provided.

According to an aspect of the present disclosure, an image reading apparatus, having a feed tray, a conveyance guide, a feed roller, a separator, a reading sensor, and a controller, is provided. The feed tray is configured to support sheets for being fed. The feed tray includes a movable plate configured to move in a vertical direction between a standby position and a feedable position being higher than the standby position according to an amount of the sheets supported by the feed tray. The conveyance guide is configured to guide the sheets conveyed from the feed tray. The feed roller is movable in the vertical direction. The feed roller is configured to feed the sheets supported by the feed tray to be conveyed along the conveyance guide. A positional relation between the feed roller and an uppermost sheet in the sheets supported by the feed tray is maintained within a predetermined range by the movable plate located at the feedable position. The separator is configured to nip and separate the sheets fed by the feed roller from one another and convey the sheets separately along the conveyance guide. The reading sensor is configured to read images of the sheets conveyed along the conveyance guide. The controller is configured to control at least rotating-and-stopping movements of the feed roller and the separator and ascending-and-descending movements of the movable plate. While the feed roller feeds the sheets, the controller is configured to conduct a vibrating action, in which the movable plate located at the feedable position is moved to ascend and descend for a plurality of times.

DETAILED DESCRIPTION

In the following paragraphs, described with reference to the accompanying drawings will be first through third embodiments of the present disclosure. It is noted that various connections may be set forth between elements in the following description. These connections in general and, unless specified otherwise, may be direct or indirect and that this specification is not intended to be limiting in this respect. It will be understood that those skilled in the art will appreciate that there are numerous variations and permutations of an image reading apparatus that fall within the spirit and scope of the invention.

First Embodiment

Figure 1:
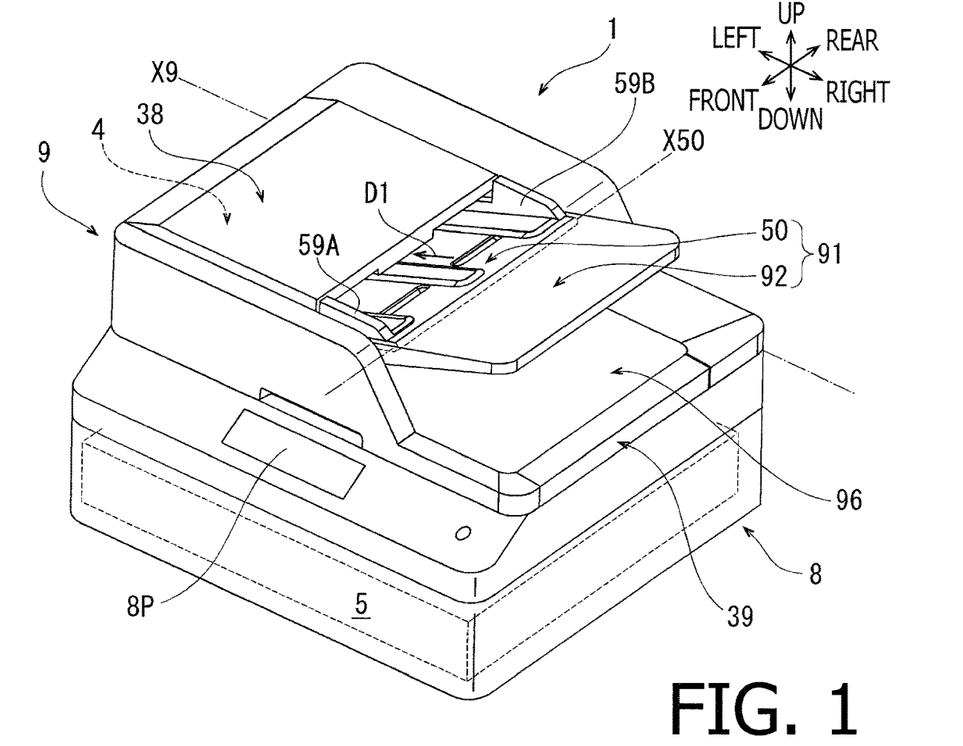
FIG. 1 is a perspective view of an image reading apparatus according to a first embodiment of the present disclosure.

FIG. 1 shows an image reading apparatus 1 according to the first embodiment of the present disclosure. As shown in FIG. 1, positional relation within the image reading apparatus 1 and each part or item included in the image reading apparatus 1 will be mentioned on basis of the orientation of the image reading apparatus 1 as indicated by arrows in FIG. 1. For example, a side, on which an operation panel 8P is arranged, is defined as a front side of the image reading apparatus 1, and a side opposite to the front side is defined as a rear side. A right-hand side and a left-hand side to a user who faces the front side of the image reading apparatus 1 are defined as a rightward side and a leftward side, respectively. Moreover, a right-to-left or left-to-right direction may be called as a crosswise direction, a front-to-rear or rear-to-front direction may be called as a front-rear direction, and a direction orthogonal to the crosswise direction and to the front-rear direction may be called as an up-down direction or a vertical direction. Furthermore, directions of the drawings in FIGS. 3-5, 8, and 11 are similarly based on the orientation of the image reading apparatus 1 as defined above and correspond to those with respect to the image reading apparatus 1 shown in FIG. 1 even when the drawings are viewed from different angles.

<Overall Configuration>

Figure 2:
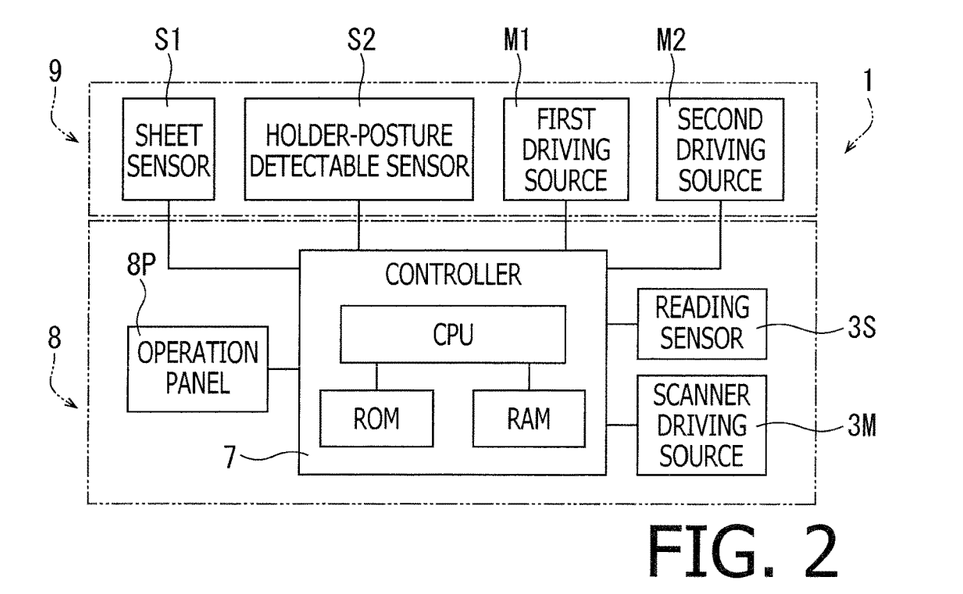
FIG. 2 is a block diagram to illustrate a configuration of the image reading apparatus according to the first embodiment of the present disclosure.
Figure 3:
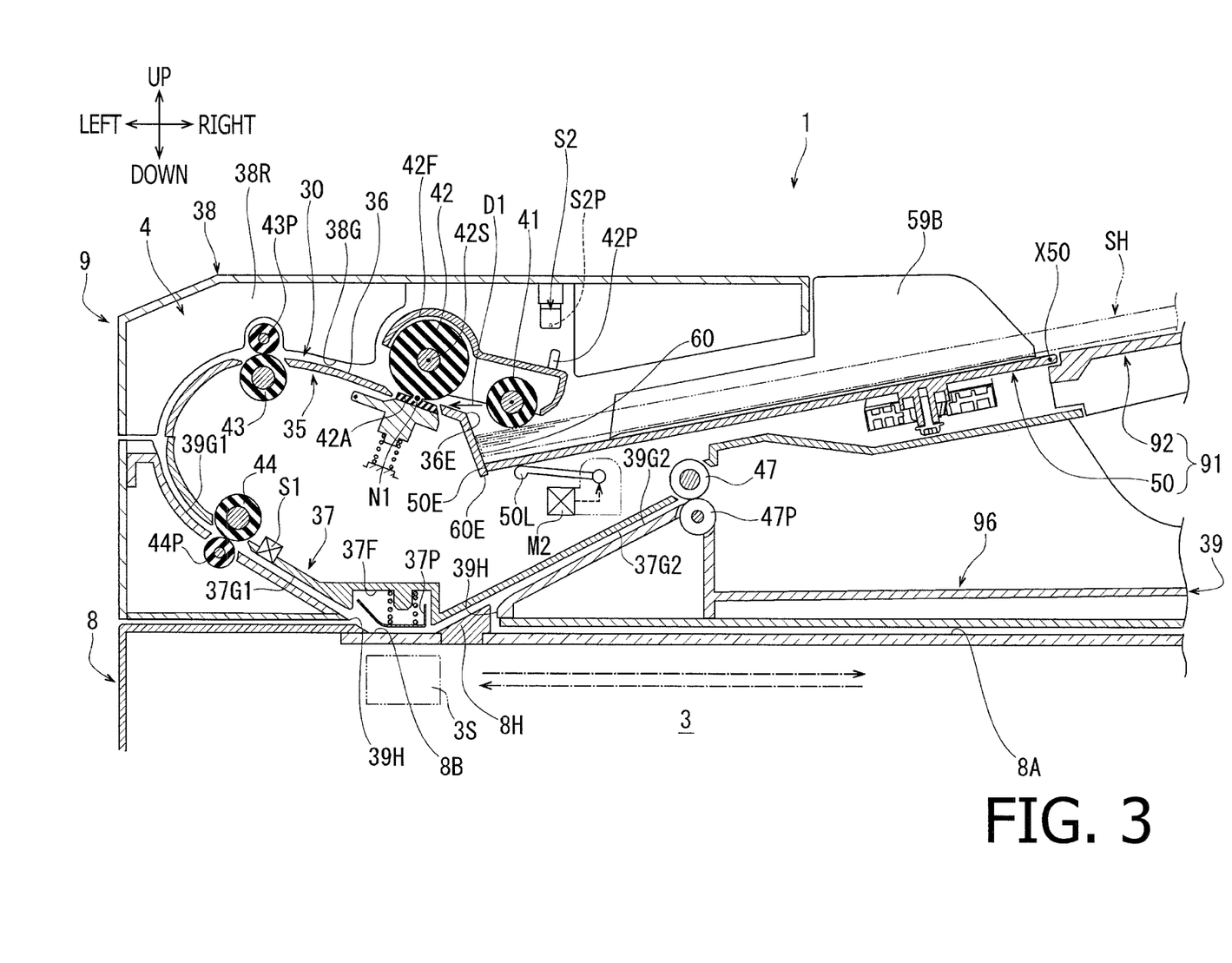
FIG. 3 is a cross-sectional partial view of the image reading apparatus according to the first embodiment of the present disclosure.

As shown in FIGS. 1-3, the image reading apparatus 1 includes a main body 8 and an openable/closable body 9. The main body 8 has an approximate shape of a short rectangular box. On a front side of the main body 8, arranged is the operation panel 8P including a touch panel. In a lower position in the main body 8, stored is an image forming unit 5, which may form an image on a sheet in one of known printing techniques such as inkjet printing and laser printing.

As shown in FIG. 3, in an upper area in the main body 8, arranged is a reader unit 3, which may be used when an image of an original document is read.

Figure 4:
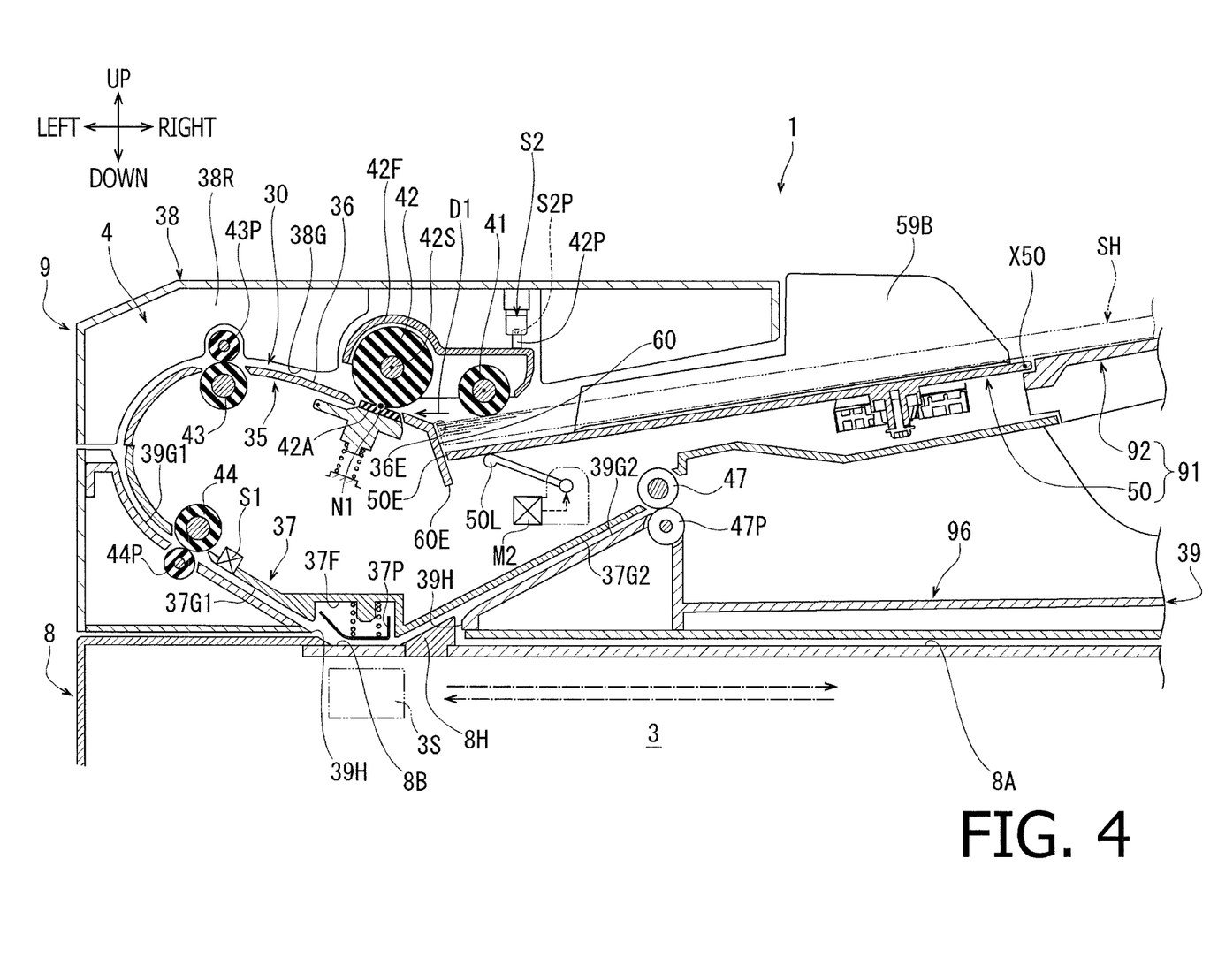
FIG. 4 is another cross-sectional partial view of the image reading apparatus according to the first embodiment of the present disclosure.
Figure 5:
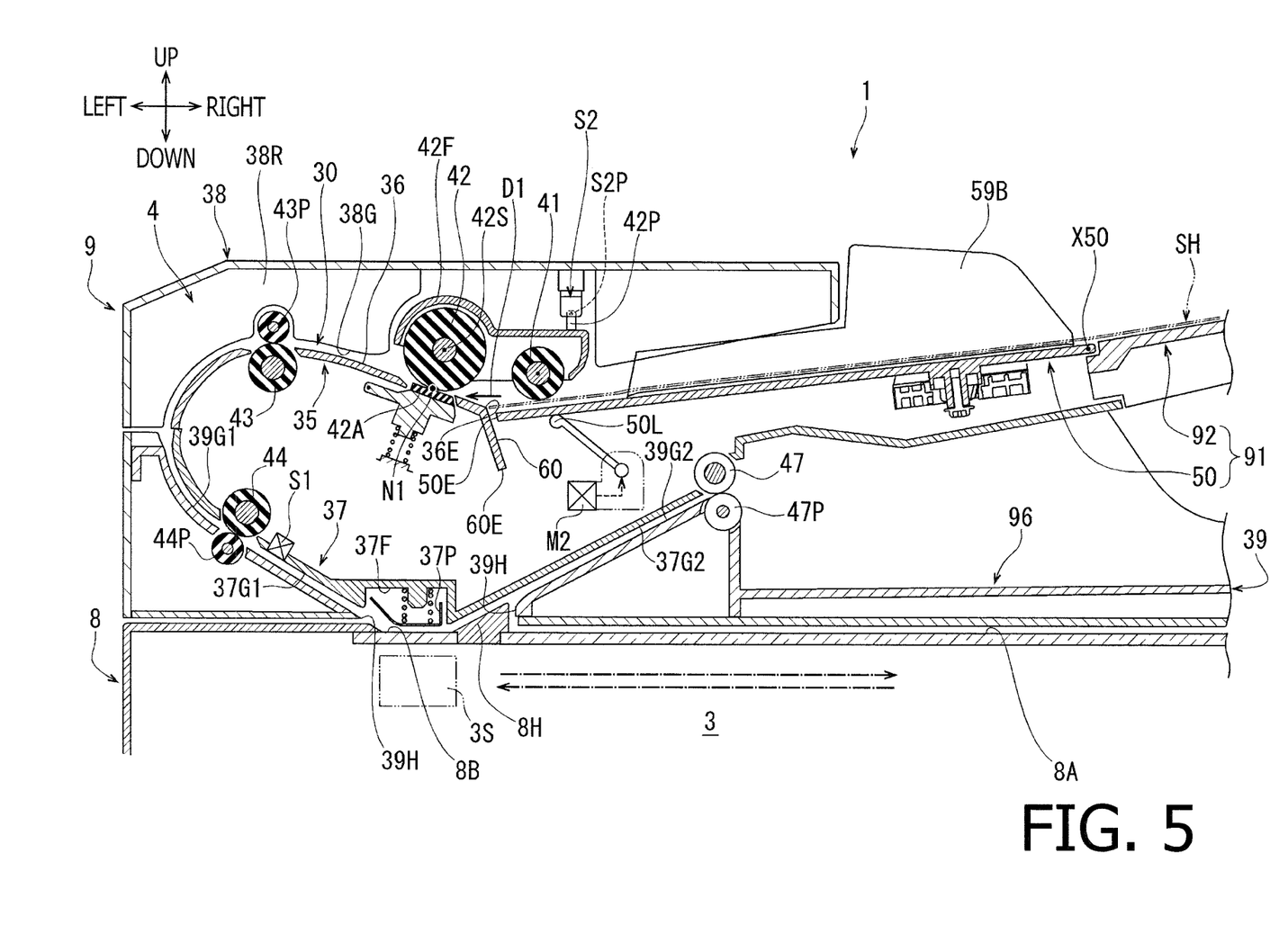
FIG. 5 is another cross-sectional partial view of the image reading apparatus according to the first embodiment of the present disclosure.

In the openable/closable body 9, arranged are a feed tray 91, an ejection tray 96, and an automatic conveyer 4. The feed tray 91 and the ejection tray 91 are arranged in a rightward area in the openable/closable body 9. As shown in FIGS. 3-5, the feed tray 91 supports one or more sheets SH to be fed. The automatic conveyer 4 includes a conveyance guide 30 arranged on a downstream side of the feed tray 91 in a conveying direction D1 to convey the sheets SH. The conveying direction D1 is a direction for each sheet SH to travel along the conveyance guide 30, leftward from the feed tray 91, turning downward and rightward in a shape of U at a leftward area in the openable/closable body 9, to reach the ejection tray 96.

The automatic conveyer 4 may be used when the sheets SH supported on the feed tray 91 are conveyed one by one in the conveying direction D1 along the conveyance guide 30 so that images of the sheets SH being conveyed are read by the reader unit 3 and ejected to rest on the ejection tray 96.

As shown in FIG. 2, the main body 8 stores a controller 7 therein. The controller 7 includes a microcomputer including, but not limited to, a CPU, a ROM, and a RAM. The ROM may store programs for controlling behaviors of the image forming apparatus 1 and for executing a variety of processes. The RAM may serve as a memory area to temporarily store data and signals, which may be used by the CPU to run the programs, and as a work area to process data. The controller 7 may control overall acts in the image reading apparatus 1 including the image forming unit 2, the reader unit 3, the automatic conveyer 4, and the operation panel 8P.

As shown in FIG. 3, on an upper side of the main body 8, arranged is a platen glass. An upper surface of the platen glass provides a document supporting surface 8A, which occupies a larger area on the upper side of the main body 8. Further, at a leftward position with respect to the document supporting surface 8A on the upper side of the main body 8, arranged is another platen glass. An upper surface of the another platen glass provides a reader surface 8B extending longitudinally in the front-rear direction.

The document supporting surface 8A may support an original document from below when the reader unit 3 reads an image of the original document placed still on the document supporting surface 8A. The original document to be read may include, for example, a sheet, including paper and OHP film, and pages of a book.

The reader surface 8B may contact each of the sheets SH being conveyed one by one by the automatic conveyer 4 from below when the reader unit 3 reads images of the sheets SH. At a position on the upper side of the main body 8 between the document supporting surface 8A and the reader surface 8B, arranged is a guiding protrusion 8H. The guiding protrusion 8H may guide the sheet SH being conveyed on the reader surface 8B to lift from the reader surface 8B and turn upper-rightward.

In the present embodiment, an object, whose image may be read by use of the document supporting surface 8A, may be called as an original document, and an object, whose image may be read while the object is being conveyed by the automatic conveyer 4, may be called as a sheet. An original document and a sheet may be substantially a same object. In other words, an original document may be used as a sheet, and a sheet may be used as an original document.

As shown in FIG. 3, the openable/closable body 9 is swingably supported by hinges, which are not shown but are arranged at a rear end area of the main body 8, to swing about an open/close axis X9 extending in the crosswise direction. When the openable/closable body 9 is at a closed position, as shown in FIG. 3, the openable/closable body 9 covers the document supporting surface 8A and the reader surface 8B from above. Although not shown in the drawings, the openable/closable body 9 may, with a frontward part thereof being moved to swing upper-rearward about the open/close axis 9A, move to an open position, in which the document supporting surface 8A and the reader surface 8B are exposed. With this swingable structure of the openable/closable body 9, the user may place the original document being the object on the document supporting surface 8A.

In the following paragraphs, positional relation within the openable/closable body 9 and each part or item contained in the openable/closable body 9 will be mentioned on basis of the posture of the openable/closable body 9 being at the closed position.

The reader unit 3 includes a reading sensor 3S, which is stored in an upper area in the main body 8, as shown in FIGS. 2 and 3, a scanner driving source 3M, as shown in FIG. 2, and a scanner device to be driven by the scanner driving source 3M, which is not shown. The reading sensor 3S may be a known image reading sensor, such as a contact image sensor (CIS) or a charge coupled device (CCD).

As shown in FIG. 3, the reading sensor 3S is located at a lower position with respect to the document supporting surface 8A and the reader surface 8B. The scanner device (not shown) is, in order to read an image of an original document supported on the document supporting surface 8A, driven by the scanner driving source 3M to move the reading sensor 3S to reciprocate in the crosswise direction in the area underneath the document supporting surface 8A in the main body 8. On the other hand, in order to read an image of a sheet SH being conveyed by the automatic conveyer 4, the scanner device is driven by the scanner driving source 3M, and the reading sensor 3S is stopped at a position underneath the reader surface 3B in the main body 8 so that the reader 3S staying still may read an image of a sheet SH being conveyed by the automatic conveyer 4. The position where the reading sensor 3S stops underneath the reader surface 3B is a predetermined stationary reading position.

<Configurations of Base Member, First Chute Member, Second Chute Member, and Cover Member>

The openable/closable body 9 includes a base member 39, a first chute member 35, a second chute member 37, and a cover member 38.

The base member 39 forms a bottom part of the openable/closable body 9. A rightward part of the base member 39 forms the ejection tray 96, and in a leftward part of the base member 39, in a range coincident with the reader surface 8B and the guiding protrusion 8H, formed is a rectangular hole 39H.

A leftward part of the base member 39 with respect to the rectangular hole 39H forms a conveyer surface 39G1. A leftward part of the conveyer surface 39G1 curves to change an orientation thereof from downward to lower-rightward and extends to incline lower-rightward to a leftward edge of the rectangular hole 39H.

A rightward part of the base member 39 with respect to the rectangular hole 39H forms a conveyer surface 39G2. The conveyer surface 39G2 inclines upper-rightward from a position adjacent to the guiding protrusion 8H.

The second chute member 37 is arranged at an upper position with respect to the leftward part of the base member 39. The second chute member 37 is formed to have a pressing-member retainer 37F and guiding surfaces 37G1, 37G2.

The pressing-member retainer 37F is a recessed portion formed to recess upward at a position to face the reader surface 8B. The pressing-member retainer 37F retains a pressing member 37P vertically movably. The pressing member 37P may press the sheet SH being conveyed on the reader surface 8B from above and restrain the sheet SH from being separated from the reader surface 8B.

The guiding surface 37G1 is located at a position leftward with respect to the pressing member retainer 37F. A leftward part of the guiding surface 37G1 curves along the leftward part of the conveyer surface 39G1 in the base member 39. Moreover, the guiding surface 37G1 inclines lower-rightward along the lower-rightward inclination of the conveyer surface 39G1 in the base member 39.

At an intermediate position on the part of the guiding surface 37G1 inclining lower-leftward, arranged is a sheet sensor S1. The sheet sensor S1 may detect presence of the sheet SH being conveyed along the conveyance guide 30 and transmit the detected result to the controller 7.

The guiding surface 37G2 is located at a position rightward with respect to the pressing-member retainer 37F. The guiding surface 37G2 inclines upper-rightward along the inclination of the guiding protrusion 8H in the main body 8 and the conveyer surface 39G2 in the base member 39.

The first chute member 35 is arranged at an upper position with respect to the second chute member 37. The first chute member 35 is formed to have a conveyer surface 36 and a restrictive surface 60.

The conveyer surface 36 is located on a downstream side of the feed tray 91 in the conveying direction D1 and extends upper-leftward. An upstream end of the conveyer surface 36 in the conveying direction D1, i.e., a rightward end of the conveyer surface 36, forms a conveyer edge 36E. A leftward end of the conveyer surface 36 curves to change an orientation thereof from leftward to downward.

The restrictive surface 60 extends downward from the conveyer edge 36E of the conveyer surface 36 in a direction intersecting with the conveying direction D1. The restrictive surface 60 may contact leading edges of the sheets SH supported on the feed tray 91. A lower end 60E of the restrictive surface 60 is located at a position lower and rightward with respect to the conveyer edge 36E of the conveyer surface 36.

The cover member 38 is arranged at an upper position with respect to the first chute member 35. The cover member 38 includes a plurality of ribs 38R that protrude downward, and lower edges of the ribs 38R form a guiding surface 38G, which virtually spreads along the lower edges of the ribs 38R. In other words, the cover member 38 includes the guiding surface 38G. A rightward part of the guiding surface 38G faces the conveyer surface 36 from above at a position displaced leftward from the conveyer edge 36E of the conveyer surface 36 in the first chute member 35. The guiding surface 38G extends to incline leftward and moderately upward along the conveyer surface 36 in the first chute member 35. A leftward part of the guiding face 38G curves along the leftward part of the conveyer surface 36 in the first chute member 35.

The conveyer surface 36 and the restrictive surface 60 in the first chute member 35, the guiding face 38G in the cover member 38, the conveyer surfaces 39G1, 39G2 in the base member 39, and the guiding surfaces 37G1, 37G2 in the second chute member 37 form a conveyance guide 30.

The conveyer surfaces 36, 39G1, 39G2, and the guiding surfaces 38G, 37G1, 37G2 extend along the conveying direction D1 and define a conveyer path, in which the sheets SH are conveyed from the feed tray 91 to the ejection tray 96.

<Configuration of Feed Tray>

As shown in FIGS. 1 and 3, the feed tray 91 is supported by side frames, which are not shown but are arranged on the frontward side and the rearward side of the openable/closable body 9, to be arranged at an upper position with respect to the ejection tray 96 to vertically overlap the ejection tray 96.

The feed tray 91 includes a feed tray body 92 and the movable plate 50. The feed tray body 92 extends from a rightward area in the openable/closable body 9 to incline moderately lower-leftward. The movable plate 50 is arranged to adjoin a leftward end portion of the feed tray body 92. The movable plate 50 extends substantially in a plane toward the restrictive surface 60 in the first chute member 35.

A leftward part of the movable plate 50 is covered by a rightward part of the cover member 38 from above. The feed tray 91 supports the sheets SH to be fed to the automatic conveyer 4 on the feed tray body 92 and the movable plate 50.

The movable plate 50 is pivotably supported by side frames, which are not shown, to pivot about a pivot axis X50 extending in the front-rear direction, as shown in FIGS. 3-5. The movable plate 50 includes a facing end 50E. The facing end 50E forms an end of the movable plate 50 on a downstream side in the conveying direction D1 and faces the restrictive face 60.

When the movable plate 50 is at the position shown in FIG. 3, the facing end 50E faces a part of the restrictive face 60 closer to the lower end 60E. The position of the movable plate 50 shown in FIG. 3 may be referred to as a standby position. When the movable plate 50 is at a position shown in FIG. 5, the facing end 50E faces another part of the restrictive face 60 closer to the conveyer edge 36E of the conveyer surface 36. In other words, the facing end 50E continues facing the restrictive surface 60 regardless of the pivoting movements of the movable plate 50.

At a lower position with respect to the movable plate 50, arranged are a link lever 50L and a second driving source M2 to drive the link lever 50L. The second driving source M2 is rotatable bidirectionally, i.e., in a normal direction or a reverse direction, under the control of the controller 7 to produce a driving force.

As the second driving source M2 rotates in the normal direction, the driving force from the second driving source M2 may be transmitted to the link lever SOL, and the link lever 50L may pivot upward and push the movable plate 50 upward. Accordingly, the movable plate 50 may pivot about the pivot axis X50 to move upward from the standby position shown in FIG. 3 to a position shown in FIG. 4 or further to a position shown in FIG. 5. The positions of the movable plate 50 shown in FIGS. 4 and 5, which are higher than the standby position, may be referred to later as feedable positions.

On the other hand, when the second driving source M2 rotates in the reverse direction, the driving force from the second driving source M2 may be transmitted to the link lever SOL so that the link lever 50L may pivot downward, and the movable plate 50 accompanying with the link lever 50L may descend. Accordingly, the movable plate 50 may pivot about the pivot axis X50 to move downward from the position shown in FIG. 5 through the position shown in FIG. 4 to the standby position shown in FIG. 3.

Meanwhile, in order to accurately control the vertical position of the movable plate 50 through the second driving source M2, for example, a direct current motor with an encoder may be employed as the second driving source M2, and the controller 7 may control the rotating and stopping movements of the second driving source M2 based on pulse signals from the encoder. For another example, a stepping motor may be employed as the second driving source M2, and the controller 7 may control the rotating and stopping movements of the second driving source M2 by controlling pulses for the stepping motor. Moreover, the controller 7 may change driving voltages to control the second driving source M2 to increase or decrease a pivoting velocity of the movable plate 50.

As shown in FIGS. 1 and 3, on the movable plate 50, arranged are two (2) width-restrictive guides 59A, 59B, which are slidable in the front-rear direction. The width-restrictive guides 59A, 59B, which are located frontward and rearward, respectively, may be moved to be closer to or farther from each other so that the width-restrictive guides 59A, 59B may flank the sheets SH to support the sheets SH steadily, regardless of a width of the sheets SH on the feed tray 91, at a position centered about a center of the feed tray 91 in a widthwise direction, which coincides with the front-rear direction.

<Configurations of Feed Roller, Separation Roller, First and Second Conveyer Rollers, and Ejection Roller>

As shown in FIG. 3, the automatic conveyer 4 includes, for conveying the sheets SH along the conveyance guide 30, a feed roller 41, a separation roller 42, a separation pad 42A, a first conveyer roller 43, a first pinch roller 43P, a second conveyer roller 44, a second pinch roller 44P, an ejection roller 47, and an ejection pinch roller 47P.

As shown in FIG. 2, the automatic conveyer 4 includes a first driving source M1, which may produce a driving force, and a driving force transmitter, which is not shown, to transmit the driving force from the first driving source M1 to the feed roller 41, the separation roller 42, the first conveyer roller 43, the second conveyer roller 44, and the ejection roller 47.

As shown in FIG. 3, the separation roller 42 is arranged at a position on a downstream side with respect to the conveyer edge 36E of the conveyer surface 36 in the first chute member 35 in the conveying direction D1 and an upper position with respect to the conveyer surface 36. A rotation shaft 42S of the separation roller 42 supports a holder 42F pivotably. The holder 42F is arranged to extend rightward from the rotation shaft 42S over the conveyer edge 36E of the conveyer surface 36.

The feed roller 41 is retained rotatably at a rightward portion of the holder 42F. The feed roller 41 is arranged at a position to face the movable plate 50 from above. The rotation shaft 42S and gears, which are not shown, in the holder 42F may transmit the driving force from the first driving source M1 to the feed roller 41 to rotate the feed roller 41 in a direction, in which the sheets SH on the feed tray 91 may be conveyed toward the conveyer surface 36 in the conveyance guide 30. The feed roller 41 is movable in the vertical direction along with pivoting movements of the holder 42F.

As shown in FIG. 3, at an upper position with respect to a rightward end area of the holder 42F, arranged is a holder-posture detectable sensor S2, which may detect whether the movable plate 50 is at the feedable position or not. In the present embodiment, the holder-posture detectable sensor S2 is a photo-interrupter including a light emitter and a light receiver. The holder-posture detectable sensor S2 may output signals corresponding to a cleared or blocked condition of a light path S2P between the light emitter and the light receiver. As shown in FIG. 2, the holder-posture detectable sensor S2 is connected with the controller 7.

In the rightward end area on an upper face of the holder 42F, arranged to protrude upward is a detectable portion 42P. The detectable portion 42P may move vertically to accompany the pivoting movements of the holder 42F to clear or block the light path S2P.

As shown in FIG. 3, when the movable plate 50 is at the standby position, a lower end of the feed roller 41 is located to be substantially lower than the conveyer edge 36E of the conveyer surface 36. In this arrangement, the detectable portion 42P clears the light path S2P.

When the controller 7 controls the second driving source M2 to rotate in the normal direction to move the movable plate 50 on the feed tray 91 that supports the sheets SH upward from the standby position, the feed roller 41 contacting the uppermost sheet SH in the sheets SH on the feed tray 91 may be pushed upward along with the holder 42F. When the detectable portion 42P on the holder 42 blocks the light path S2P in the holder-posture detectable sensor S2, the controller 7 may control the second driving source M2 to stop rotating shortly after the time when the light path S2P was blocked. Thus, the movable plate 50 may be located at the feedable position, as shown in FIG. 4 or 5.

In this regard, the feedable position may not be a pinpoint position but may be a position variable within a predetermined range and may vary depending on a quantity or height of the sheets SH stacked on the feed tray 91.

Thus, the movable plate 50 is movable between the standby position as shown in FIG. 3 and the feedable position shown in FIG. 4 or 5. When the movable plate 50 is located at the feedable position, a positional relation between the feed roller 41 and the uppermost sheet SH in the sheets SH supported by the feed tray 91 is maintained.

When the movable plate 50 is at the feedable position shown in FIG. 4 or 5, a height difference between the uppermost sheet SH in the sheets SH on the feed tray 91 and the conveyer edge 36E of the conveyer surface 36 is in a correct range, in which the uppermost sheet SH may move to the conveyer surface 36 without colliding with the conveyer edge 36E. Therefore, the feed roller 41 may feed the uppermost sheet SH to the conveyer surface 36 toward a position between the separation roller 42 and the separation pad 42A.

As shown in FIG. 3, the separation pad 42A is supported by the first chute member 35 at a position directly below the separation roller 42 in an arrangement to be exposed from the conveyer surface 36. The separation pad 42A is urged toward the separation roller 42. In the following paragraphs, a position, at which the separation roller 42 and the separation pad 42A nips the sheet SH, may be called as a nipping position N1.

The separation roller 42 may apply a conveying force directed downstream in the conveying direction D1 to the sheet SH reaching the nipping position N1. The separation pad 42A may, when two or more sheets SH are conveyed to the nipping position N1, apply a force to stop the conveyance to the sheet(s) SH other than the sheet SH that contacts the separation roller 42.

The first conveyer roller 43 is supported by the first chute member 35, at an intermediate position in the conveyer surface 36 in the conveying direction D1. The first pinch roller 43P is supported by the cover member 38 at a position on the guiding surface 38G and is urged toward the first conveyer roller 43. The first roller 43 may, together with the first pinch roller 43P, nip the sheet SH separated from the other sheets SH by the separation roller 42 and the separation pad 42A and convey the separated sheet SH toward the second conveyer roller 44 and the second pinch roller 44P.

The second conveyer roller 44 is supported by the second chute member 37, at a position upstream from the sheet sensor S1 in the guiding surface 37G1 in the conveying direction D1. The second pinch roller 44P is supported by the base member 39 at a position on the conveyer surface 39G1 and is urged toward the second conveyer roller 44. The second roller 44 may, together with the second pinch roller 44P, nip the sheet SH conveyed by the first conveyer roller 43 and the first pinch roller 43P and convey the sheet SH toward the reader surface 8B, i.e., toward the reading sensor 3S staying still at the stationary reading position.

The ejection roller 47 is supported by the second chute member 37 at a position in a rightward end area in the guiding surface 37G2. The ejection pinch roller 47P is supported by the base member 39 at a position in a rightward end area in the conveyer surface 39G2 and is urged toward the ejection roller 47. The ejection roller 47 may, together with the ejection pinch roller 47P, nip the sheet SH passing over the reader surface 8B and being guided by the conveyer surface 39 and the guiding surface 37G2 and eject the sheet SH at the ejection tray 96.

<Image Reading Action to Original Document Supported on the Document Supporting Surface>

When the image reading apparatus 1 described above reads an image of an original document supported on the document supporting surface 8A, the controller 7 controls the scanner driving source 3M in the reader unit 3 to operate the scanner device, which is not shown, to move the reading sensor 3S in the crosswise direction from a read-start position located underneath a leftward edge of the document supporting surface 8A to a read-end position located underneath a rightward edge of the document supporting surface 8A. Meanwhile, the reading sensor 3S reads an image of the original document supported on the document supporting surface 8A. Thereafter, the controller 7 controls the scanner driving source 3M in the reader unit 3 to operate the scanner device to move the reading sensor 3S that finished reading in a reverse direction to move from the rightward end to the leftward end and return to a sensor-standby position.

<Image Reading Action and Vibrating Action with Automatic Conveyer>

The image reading apparatus 1 may convey the sheet SH supported on the feed tray 91 through the automatic conveyer 4 and read an image of the sheet SH being conveyed. In particular, the controller 7 controls the scanner driving source 3M of the reader unit 3 to operate the scanner device to place the reading sensor 3S at the stationary reading position located underneath the reader surface 8B.

Next, the controller 7 controls the second driving source M2 to rotate in the normal direction to cause the link lever 50L to pivot upward and the movable plate 50 to move upward from the standby position shown in FIG. 3. When the detectable portion 42P of the holder 42F blocks the light path S2P in the holder-posture detectable sensor S2, the controller 7 controls the second driving source M2 to stop rotating shortly after the time when the light path S2P was blocked so that the movable plate 50 may be located at the feedable position, as shown in FIG. 4.

Figure 7:
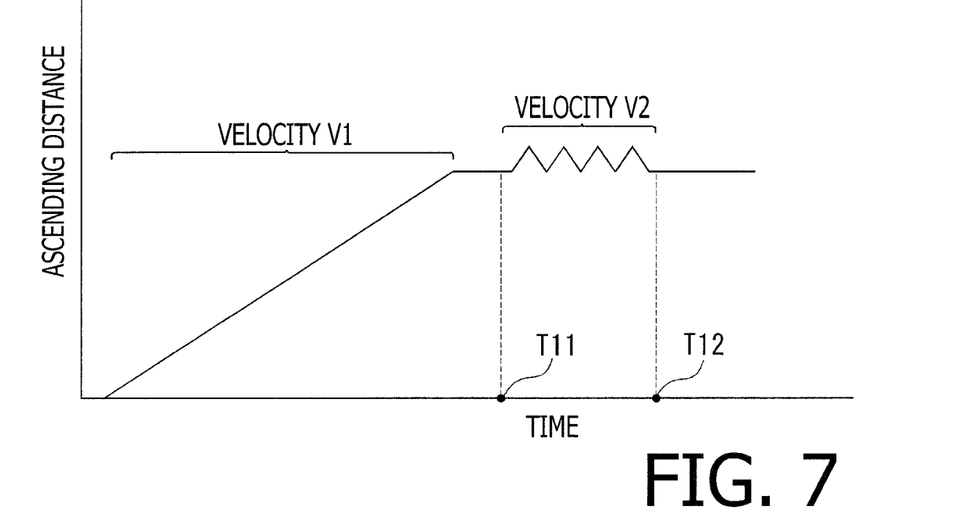
FIG. 7 is a graph to illustrate ascending and descending movements of a movable plate in the image reading action in the image forming apparatus according to the first embodiment of the present disclosure.

The controller 7 may move the movable plate 50 to the feedable position by controlling the behavior of the second driving source M2 so that the movable plate 50 may ascend at a constant velocity V1 as shown in FIG. 7.

Figure 6:
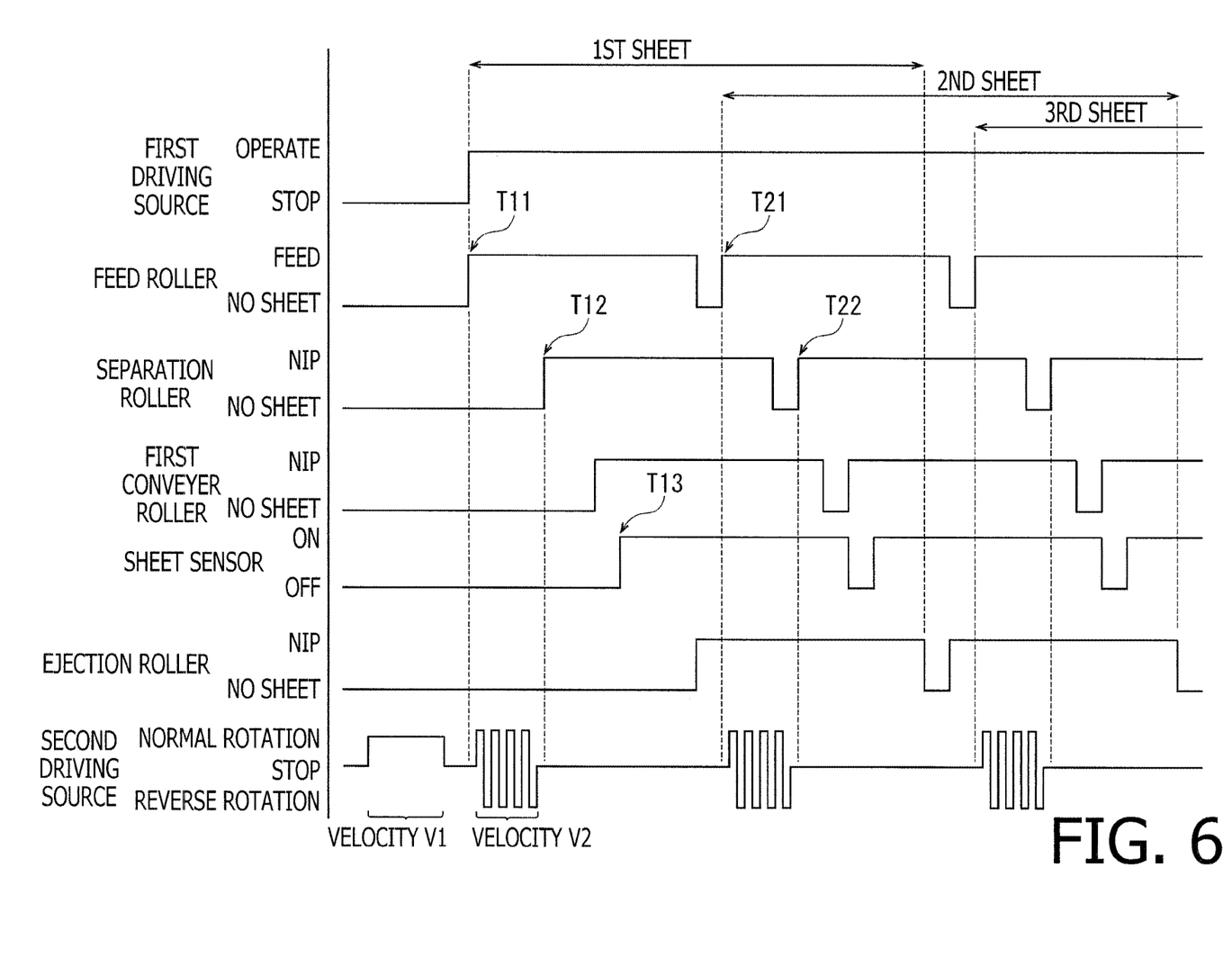
FIG. 6 is a timing chart during an image reading action in the image forming apparatus according to the first embodiment of the present disclosure.

Next, as shown in FIG. 6, the controller 7 operates the first driving source M1 to drive the feed roller 41, the separation roller 42, the first conveyer roller 43, the second conveyer roller 44, and the ejection roller 47 to convey the sheets SH on the feed tray 91 one by one along the conveyance guide 30. Moreover, the controller 7 conducts a vibrating action, in which the movable plate 50 is moved up and down for a plurality of times.

In particular, the sheets SH including the uppermost sheet SH on the feed tray 91 may be fed by the feed roller 41 and reach the nipping position N1 to be nipped by the separation roller 42 and the separation pad 42A. The uppermost sheet SH among the sheets SH reaching the nipping position N1 may be separated by the separation roller 42 and the separation pad 42A from the other sheets SH and further nipped by the first conveyer roller 43 and the first pinch roller 43P. Thereafter, the separated sheet SH may be nipped by the second conveyer roller 44 and the second pinch roller 44P to switch the sheet sensor S1 on.

In the present embodiment, a timing, at which the feed roller 41 starts feeding a first sheet SH will be called as timing T11. A timing, at which the separation roller 42 nips the first sheet SH, will be called as timing T12, and a timing, at which the sheet sensor S1 is switched on will be called as timing T13. Moreover, a timing, at which the feed roller 41 starts feeding a second sheet SH, will be called as timing T21, and a timing, at which the separation roller 42 nips the second sheet SH, will be called as timing T22.

The timing T11 coincides with a timing, at which the controller 7 activates the first driving source M1 to operate. The controller 7 may determine the timing T12 based on several conditions including a length of time elapsed since the activation of the first driving source M1 and a conveying velocity to convey the sheet SH. Moreover, the controller 7 may determine the timings T21, T22 based on several conditions including a length of time elapsed since the timing T12, at which the sheet sensor S1 is switched on, and the conveying velocity to convey the sheets SH. Timings concerning a third sheet SH and sheets SH being fed onward may be determined in the same regularity.

The controller 7 conducts the vibrating action, in which the movable plate 50 is moved up and down for a plurality of times, between a time shortly after the timing T11, at which the feed roller 41 started feeding the first sheet SH, and a time shortly before the timing T12, at which the separation roller 42 nips the first sheet SH. Moreover, the controller 7 may conduct the vibrating action, in which the movable plate 50 is moved up and down for a plurality of times, between a time shortly after the timing T21, at which the feed roller 41 started feeding the second sheet SH, and a time shortly before the timing T22, at which the separation roller 42 nips the second sheet SH. The controller 7 may further conduct the vibrating action regarding the third and onward sheets SH.

When the controller 7 conducts the vibrating action to the movable plate 50, the controller 7 may, as shown in FIG. 7, control the behavior of the second driving source M2 so that the movable plate 50 may move up and down at a constant velocity V2. In the present embodiment, the velocity V2 is set to be greater than the velocity V1. An amplitude of moving up and down for the movable plate 50 is set to stay within a range, in which the movable plate 50 should not descend to be lower than the feedable position.

Through this vibrating action to the movable plate 50, leading edges of the sheets SH to be fed by the feed roller 41 may be tossed instantaneously from the conveyer surface 36 of the conveyance guide 30. Therefore, the leading edges of the sheets SH, which may be thinner sheets SH with more pliability, or may curl easily, may be restrained from being caught by or collide with small bumps or bends on the conveyance guide 30.

When the sheet SH being conveyed on the conveyer surfaces 36, 39G1, 39G2 passes over the reader surface 8B, the controller 7 controls the reading sensor 3S staying still at the stationary reading position to read the image of the sheet SH. Thereafter, the sheet SH, whose image has been read, is conveyed by the ejection roller 47 and the ejection pinch roller 47P and to be ejected at the ejection tray 96.

While the sheets SH are being conveyed from the feed tray 91 along the conveyance guide 30, the controller 7 controls the second driving source M2 to rotate intermittently, based on signals from the holder-posture detectable sensor S2 and the reduced amount of the sheets SH on the feed tray 91, to cause the movable plate 50 to pivot upward little by little in small motions so that the posture of the holder 42F may be maintained in the predetermined range.

After the amount of the sheets SH on the feed tray 91 is reduced, as shown in FIG. 5, and when no further sheet SH remains on the feed tray 91, the controller 7 stops the first driving source M1 and the second driving source M2 to terminate the image reading action.

Thereafter, the controller 7 controls the scanner driving source 3M in the reader unit 3 to operate the scanner device to move the reading sensor 3S to return to the sensor-standby position. Moreover, the controller 7 controls the second driving source M2 to rotate in the reverse direction to move the link lever 50L to pivot downward so that the movable plate 50 may return to the position shown in FIG. 3.

<Benefits>

According to the image reading apparatus 1 in the embodiment described above, through the vibrating action to move the movable plate 50 up and down for a plurality of times, as shown in FIGS. 6 and 7, the sheets SH to be fed by the feed roller 41 may vibrate. Therefore, the leading edges of the sheets SH to be fed by the feed roller 41, including thinner sheets SH with more pliability or sheets SH that may curl easily, may be tossed instantaneously from the conveyer surface 36 of the conveyance guide 30 so that the leading edges of the sheets SH may be restrained from being caught by or collide with small bumps or bends on the conveyance guide 30.

Thus, the image reading apparatus 1 may accept a variety of types of sheets SH to be conveyed smoothly along the conveyance guide 30.

Moreover, the controller 7 may conduct the vibrating action to the movable plate 50 to move up and down within the range, in which the movable plate 50 should not descend to be lower than the feedable position, before the sheet SH being fed by the feed roller 41 is nipped by the separation roller 42 and the separation pad 42A. Therefore, the sheet SH being vibrated in the vibrating action may be restrained from descending to a position which is too low to be conveyed correctly.

Moreover, the controller 7 may control the vibrating action to the movable plate 50 to be completed before the sheet SH conveyed by the feed roller 41 is nipped by the separation roller 42 and the separation pad 42A. Therefore, while the vibrating action may be conducted in a shorter time, the leading edge of the sheet SH may be prevented from being caught securely.

Second Embodiment

Figure 8:
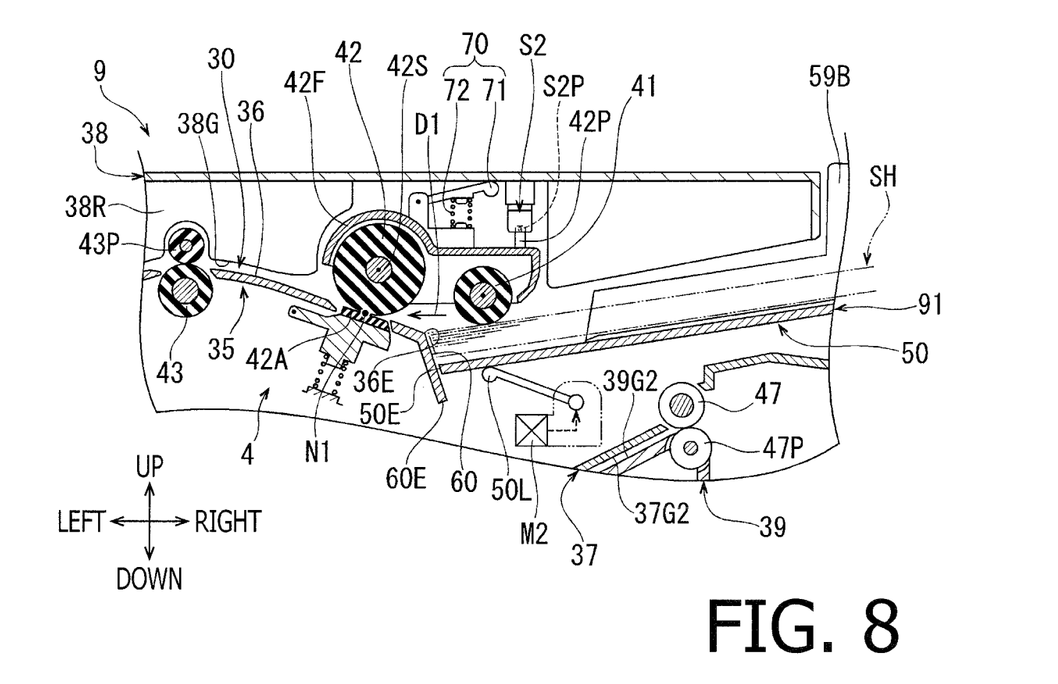
FIG. 8 is a cross-sectional partial view of the image reading apparatus according to a second embodiment of the present disclosure.

As shown in FIG. 8, an image reading apparatus in the second embodiment of the present disclosure may be different from the image reading apparatus 1 described in the first embodiment in that a pressing device 70 is provided on an upper face of the holder 42F.

The pressing device 70 includes a pressing lever 71 and a compressed coil spring 72. The pressing lever 71 is swingably supported by the holder 42F at one end thereof, and the other end of the pressing lever 71 may contact an inner or downward surface of the cover member 38 from below. The compressed coil spring 72 is arranged between the holder 42F and the pressing lever 71 and applies an urging force that may separate the pressing member 71 from the holder 42F to the pressing member 71. The pressing device 70 in this configuration may urge the holder 42F so that the holder 42F tends to pivot downward, and feed roller 41 supported by the holder 42F the holder 42F may be urged against the sheets SH supported on the feed tray 91.

The controller 7 in the image reading apparatus in the second embodiment may obtain thickness information, which is information concerning a thickness, or stacked height, of the sheets SH supported on the feed tray 91 based on information such as settings input by a user through the operation panel 8P. The thickness information may be, for example, numerical information indicating the actual thickness of the sheet SH, or, for another example, information indicating a type of the sheet SH such as cardboard, postcard, or OHP sheet, from which the actual thickness of the sheet SH may be estimated.

The remainder of the image reading apparatus in the second embodiment is identical to the image reading apparatus 1 described in the first embodiment. Therefore, items or structures which are the same as those in the image reading apparatus 1 may be denoted by the same reference sings, and description of those is herein omitted.

Figure 9:
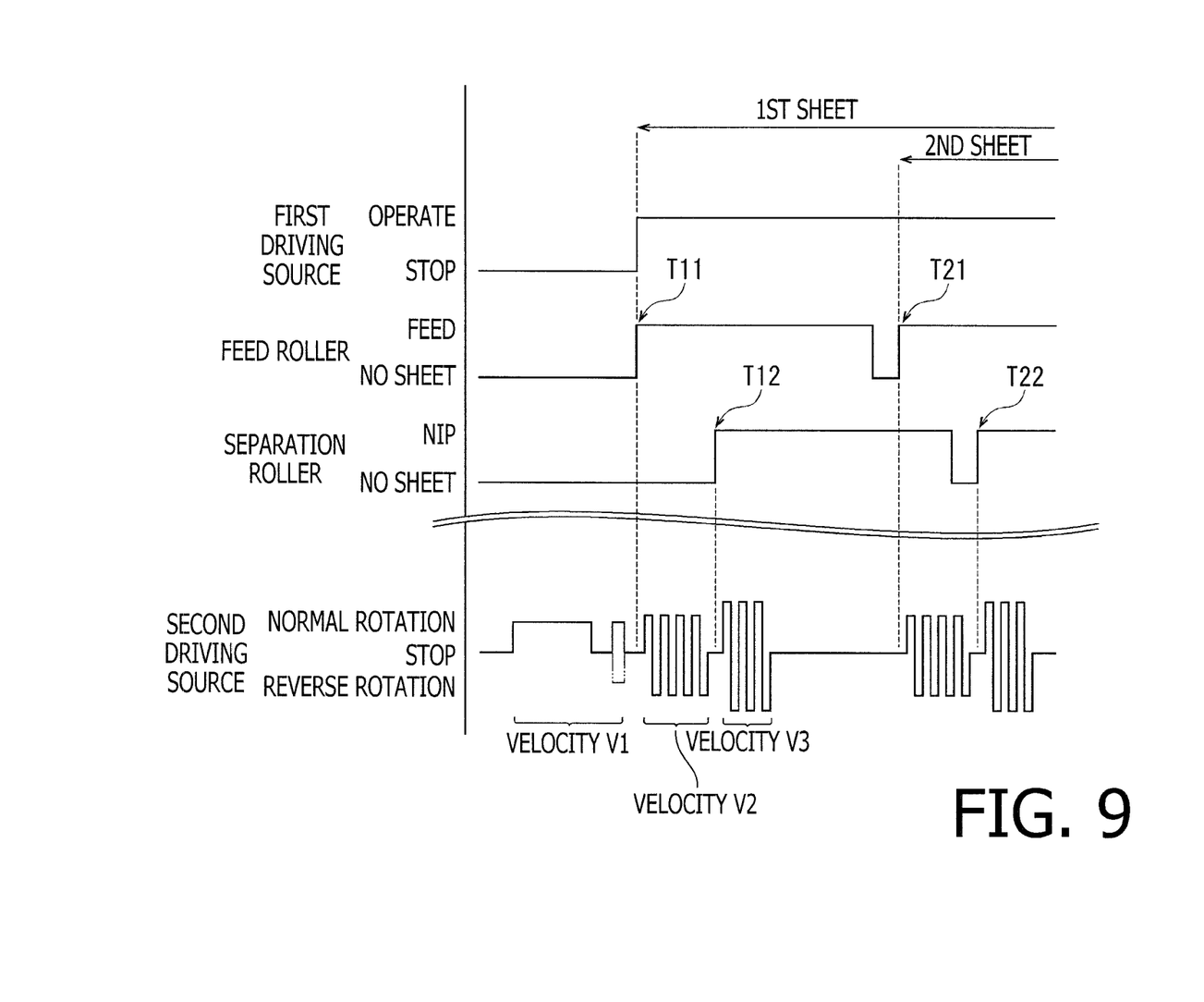
FIG. 9 is a timing chart during an image reading action in the image forming apparatus according to the second embodiment of the present disclosure.
Figure 10:
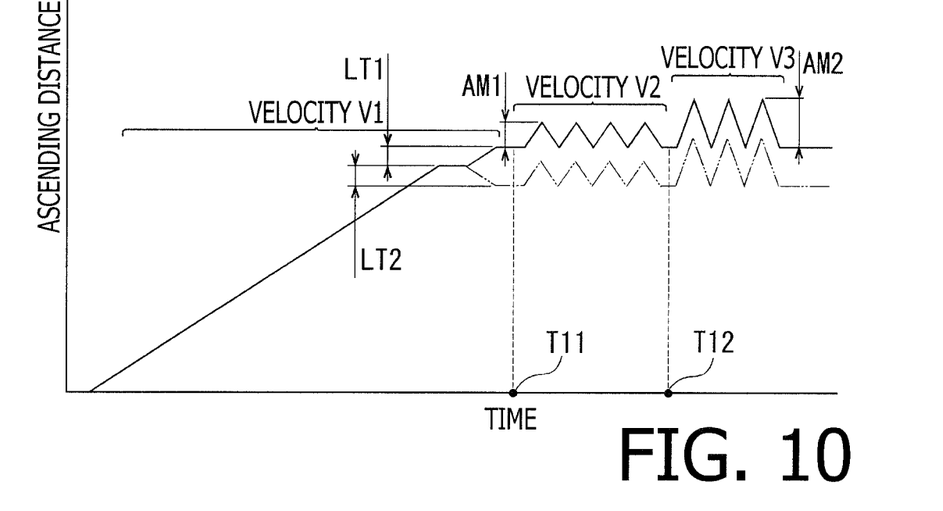
FIG. 10 is a graph to illustrate ascending and descending movements of the movable plate in the image reading action in the image forming apparatus according to the second embodiment of the present disclosure.

When, for example, the controller 7 in the image reading apparatus obtains the thickness information that indicates the sheets SH supported on the feed tray 91 are thinner than standard sheets SH, the controller 7 may move the movable plate 50 to the feedable position and thereafter upward to ascend a distance LT1, which corresponds to the obtained thickness information, as shown in solid lines in FIGS. 9 and 10.

On the other hand, when the controller 7 obtains the thickness information indicating that the sheets SH supported on the feed tray 91 are thicker than the standard sheets SH, the controller 7 may move the movable plate 50 to the feedable position and thereafter downward to descend a distance LT2, which corresponds to the obtained thickness information, as shown in dash-and-dots lines in FIGS. 9 and 10.

Thus, the pressure from the feed roller 41 against the sheets SH may be adjusted according to the thickness of the sheets SH supported on the feed tray 91.

Moreover, the controller 7 may conduct a vibrating action, in which the movable plate 50 is moved up and down for a plurality of times at a first amplitude AM1, shortly after the timing T11, at which the feed roller 41 starts feeding the first sheet SH, until shortly before the timing T12, at which the separation roller 42 nips the first sheet SH. Further, the controller 7 may conduct a vibrating action, in which the movable plate 50 is moved up and down at a second amplitude AM2 for a predetermined length of time shortly after a lapse of the timing T12.

Furthermore, the controller 7 may conduct the vibrating action, in which the movable plate 50 is moved up and down for a plurality of times at the first amplitude AM1, shortly after the timing T21, at which the feed roller 41 starts feeding the second sheet SH, until shortly before the timing T22, at which the separation roller 42 nips the second sheet SH. Further, the controller 7 may conduct the vibrating action, in which the movable plate 50 is moved up and down at the second amplitude AM2 for the predetermined length of time shortly after a lapse of the timing T22. The controller 7 may conduct the vibrating actions to the movable plate 50 in the same regularity for the third and onward sheets SH.

When the controller 7 conducts the vibrating action to the movable plate 50 at the second amplitude AM2, the controller 7 may control the behavior of the second driving source M2 so that the movable plate 50 may move up and down at a constant velocity V3. In the present embodiment, the velocity V3 is set to be greater than the velocity V2. The second amplitude AM2 of moving up and down for the movable plate 50 is set to stay within a range, in which the movable plate 50 should not descend to be lower than the feedable position. However, during the vibrating action at the second amplitude AM2, the sheet SH is being nipped by the separation roller 42. Therefore, it may be allowable that the second amplitude AM2 falls out of the range, in which the movable plate 50 should not descend to be lower than the feedable position, to a small extent.

In the image reading apparatus according to the second embodiment, the image reading apparatus may accept a variety of types of sheets SH to be conveyed smoothly along the conveyance guide 30, similarly to the image reading apparatus 1 in the first embodiment.

Moreover, the vibrating action to the movable plate 50 may be conducted for the predetermined length of time after the sheet SH being conveyed by the feed roller 41 is nipped by the separation roller 42 and the separation pad 42A, and thereafter, the amplitude to move the movable plate 50 up and down in the later vibrating action may be switched from the first amplitude AM1 to the second amplitude SM2, which is greater than the first amplitude AM1. Thereby, the leading edge of the sheet SH may be prevented from being caught by or collide with the conveyance guide 30 more effectively.

Moreover, the controller 7 may obtain the thickness information concerning the sheets SH supported on the feed tray 91, move the movable plate 50 to the feedable position, and thereafter move the movable plate 50 to ascend or descend for the distance, i.e., either the distance LT1 or LT2, corresponding to the thickness information. In this configuration, the pressing force of the feed roller 41 against the sheets SH may be correctly adjusted according to the thickness of the sheets SH supported on the feed tray 91. In particular, when the sheets SH supported on the feed tray 91 are thinner sheets SH with less rigidity, the pressing force of the feed roller 41 may be increased so that the sheets SH with more pliability may be preferable fed by the aid of the increased pressing force. Therefore, the sheets SH in a variety of types may be accepted to be conveyed even more smoothly along the conveyance guide 30.

Third Embodiment

Figure 11:
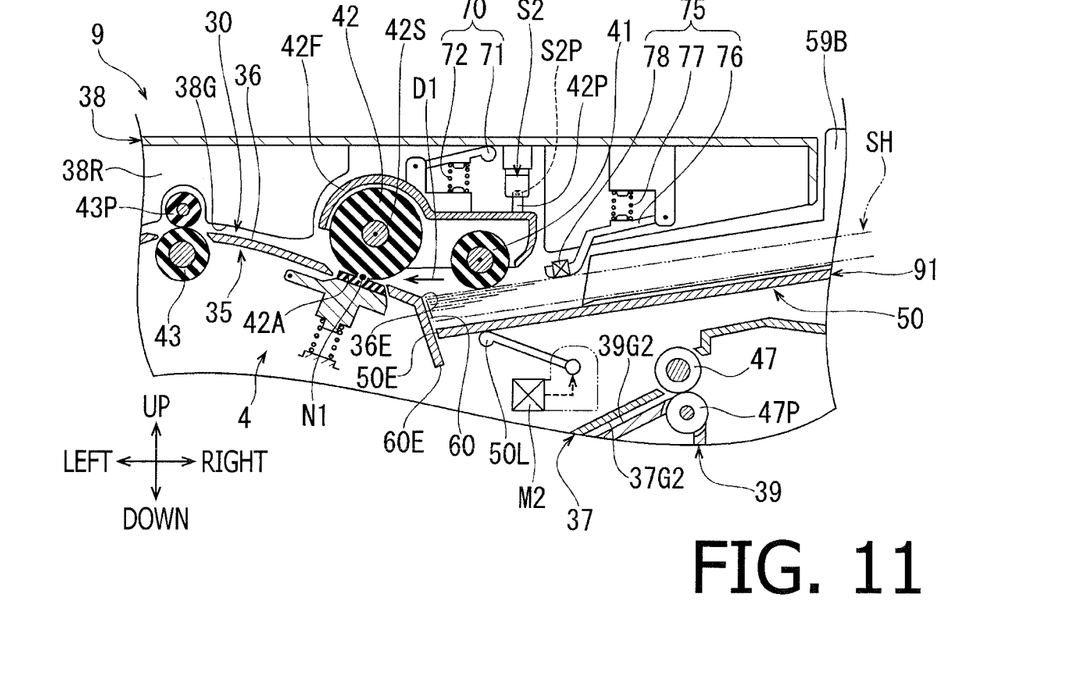
FIG. 11 is a cross-sectional partial view of the image reading apparatus according to a third embodiment of the present disclosure.

As shown in FIG. 11, an image reading apparatus in the third embodiment of the present disclosure may be different from the image reading apparatus with the pressing device 70 in the second embodiment in that a thickness detector 75 is provided.

The thickness detector 75 includes a sensor supporting portion 76, a thickness sensor 78, and a compressed coil spring 77. The sensor supporting portion 76 is swingably supported by the cover member 38 at one end thereof, and the other end of the sensor supporting portion 76 may contact the uppermost sheet SH in the sheets SH supported on the feed tray 91 from above. The thickness sensor 78 is retained at the other end of the sensor supporting portion 76. The thickness sensor 78 may be, for example, an ultrasonic sensor that emits ultrasonic waves at the sheets SH stacked on the feed tray 91, receives the waves reflected on the sheets SH, and detects the thickness of the sheets SH based on the received waves. The compressed coil spring 77 is arranged between the cover member 38 and the sensor supporting portion 76 and may apply an urging force to separate the sensor supporting portion 76 downward from the cover member 38 to the sensor supporting portion 76 so that the thickness sensor 78 may press the thickness sensor 78 against the upper most sheet SH in the stacked sheets SH on the feed tray 91.

The controller 7 in the image reading apparatus in the third embodiment may obtain numerical information indicating the thickness of the sheets SH detected by the thickness sensor 78 in the thickness detector 75 as the thickness information and conduct the vibrating actions to the movable plate 50 in the same manner as the controller 7 in the image reading apparatus in the second embodiment.

The remainder of the image reading apparatus in the third embodiment is identical to the image reading apparatuses described in the first and second embodiments. Therefore, items or structures which are the same as those in the image reading apparatus 1 may be denoted by the same reference sings, and description of those is herein omitted.

In the image reading apparatus according to the second embodiment, the image reading apparatus may accept a variety of types of sheets SH to be conveyed smoothly along the conveyance guide 30, similarly to the image reading apparatuses in the first and second embodiments.

Moreover, according to the image reading apparatus with the thickness detector 75, the user's work to input or set the thickness of the sheets SH on the feed tray 91 may be omitted. Further, the movable plate 50 may be moved upward or downward for the distance corresponding to the numerical information indicating the thickness of the sheets SH detected by the detectable sensor 78. Therefore, the pressing force of the feed roller 41 against the sheets SH may be adjusted effectively.

Although examples of carrying out the invention have been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the separation pad 42A to work with the separation roller 42 may be replaced with a retard roller.

For another example, the relativity in magnitudes among the velocities V1, V2, and V3 in the second and third embodiments may not necessarily be limited to that described above. For example, the velocities V1, V2, and V3 may be interchanged or may be equal. Similarly, the first amplitude AM1 may not necessarily be smaller than the second amplitude AM2, but the first and the second amplitudes AM1, AM2 may be inverted or may be equal.

What is claimed is:

1. An image reading apparatus, comprising:
   a feed tray configured to support sheets for being fed, the feed tray comprising a movable plate configured to move in a vertical direction between a standby position and a feedable position being higher than the standby position according to an amount of the sheets supported by the feed tray;
   a conveyance guide configured to guide the sheets conveyed from the feed tray;
   a feed roller movable in the vertical direction, the feed roller being configured to feed the sheets supported by the feed tray to be conveyed along the conveyance guide, a positional relation between the feed roller and an uppermost sheet in the sheets supported by the feed tray being maintained within a predetermined range by the movable plate located at the feedable position;
   a separator configured to nip and separate the sheets fed by the feed roller from one another and convey the sheets separately along the conveyance guide;
   a reading sensor configured to read images of the sheets conveyed along the conveyance guide; and
   a controller configured to control at least rotating-and-stopping movements of the feed roller and the separator and ascending-and-descending movements of the movable plate,
   wherein, while the feed roller feeds the sheets, the controller is configured to conduct a vibrating action, in which the movable plate located at the feedable position is moved to ascend and descend for a plurality of times, and
   wherein the controller conducts the vibrating action at a first amplitude before the separator nips the sheets fed by the feed roller and at a second amplitude after the separator nips the sheets fed by the feed roller, and wherein the second amplitude is greater than the first amplitude.

2. The image reading apparatus according to claim 1, wherein the controller is configured to conduct the vibrating action to move the movable plate within a range, in which the movable plate does not descend to be lower than the feedable position, before the separator nips the sheets fed by the feed roller.

3. The image reading apparatus according to claim 1, wherein the controller is configured to end the vibrating action before the separator nips the sheets fed by the feed roller.

4. The image reading apparatus according to claim 1, further comprising a pressing member configured to press the feed roller against the sheets supported by the feed tray, wherein the controller is configured to
   obtain thickness information concerning a thickness of the sheets supported by the feed tray,
   move the movable plate to the feedable position, and
   move the movable plate to one of ascend and descend for a distance corresponding to the thickness information.

5. The image reading apparatus according to claim 4, further comprising a detector configured to detect the thickness of the sheets supported by the feed tray,
   wherein the controller is configured to obtain a detected result from the detector as the thickness information.

6. An image reading apparatus, comprising:
   a feed tray configured to support sheets for being fed, the feed tray comprising a movable plate configured to move in a vertical direction between a standby position and a feedable position being higher than the standby position according to an amount of the sheets supported by the feed tray;
   a conveyance guide configured to guide the sheets conveyed from the feed tray;
   a feed roller movable in the vertical direction, the feed roller being configured to feed the sheets supported by the feed tray to be conveyed along the conveyance guide, a positional relation between the feed roller and an uppermost sheet in the sheets supported by the feed tray being maintained within a predetermined range by the movable plate located at the feedable position;
   a separator configured to nip and separate the sheets fed by the feed roller from one another and convey the sheets separately along the conveyance guide;
   a reading sensor configured to read images of the sheets conveyed along the conveyance guide;
   a pressing member configured to press the feed roller against the sheets supported by the feed tray; and
   a controller configured to
   obtain thickness information concerning a thickness of the sheets supported by the feed tray,
   move the movable plate to the feedable position,
   move the movable plate to one of ascend and descend for a distance corresponding to the thickness information, and
   control at least rotating-and-stopping movements of the feed roller and the separator and ascending-and-descending movements of the movable plate,
   wherein, while the feed roller feeds the sheets, the controller is configured to conduct a vibrating action, in which the movable plate located at the feedable position is moved to ascend and descend for a plurality of times.

7. The image reading apparatus according to claim 6, wherein the controller is configured to conduct the vibrating action to move the movable plate within a range, in which the movable plate does not descend to be lower than the feedable position, before the separator nips the sheets fed by the feed roller.

8. The image reading apparatus according to claim 6, wherein the controller is configured to end the vibrating action before the separator nips the sheets fed by the feed roller.

9. The image reading apparatus according to claim 6, further comprising a detector configured to detect the thickness of the sheets supported by the feed tray,
   wherein the controller is configured to obtain a detected result from the detector as the thickness information.

* * * * *